(12) United States Patent
Sousa

(10) Patent No.: US 7,440,026 B2
(45) Date of Patent: Oct. 21, 2008

(54) WIRELESS RECEIVER MOUNTING SYSTEM FOR VIDEO CAMERAS

(76) Inventor: David Sousa, 764 - 1/2 Tourmaline St., San Diego, CA (US) 92109

( * ) Notice: Subject to any disclaimer, the term of this patent is extended or adjusted under 35 U.S.C. 154(b) by 341 days.

(21) Appl. No.: 10/534,553

(22) PCT Filed: Jan. 2, 2004

(86) PCT No.: PCT/US2004/000087

§ 371 (c)(1),
(2), (4) Date: May 10, 2005

(87) PCT Pub. No.: WO2004/063573

PCT Pub. Date: Jul. 29, 2004

(65) Prior Publication Data

US 2006/0055821 A1    Mar. 16, 2006

Related U.S. Application Data

(60) Provisional application No. 60/437,681, filed on Jan. 3, 2003.

(51) Int. Cl.
*H04N 5/225* (2006.01)
(52) U.S. Cl. ...................................................... 348/375
(58) Field of Classification Search ................ 348/375, 348/373, 376; 396/420, 422, 419, 428
See application file for complete search history.

(56) References Cited

U.S. PATENT DOCUMENTS

| | | | |
|---|---|---|---|
| 6,215,518 B1 * | 4/2001 | Watkins | 348/148 |
| 6,445,408 B1 * | 9/2002 | Watkins | 348/148 |
| 6,601,999 B1 * | 8/2003 | McTeer | 396/420 |

* cited by examiner

*Primary Examiner*—Lin Ye
*Assistant Examiner*—Amy Hsu

(57) ABSTRACT

A bracket system used for mounting wireless microphone receivers and other accessories to a video camera. This bracket system is comprised of three main parts. The first part comprises a platform with a mounting screw which attaches to the bottom of the video camera; a threaded mounting hole to allow mounting to a tripod; and a combination of a pin and a resilient pad to help secure the video camera from twisting. The second part comprises a vertical section with a system of mounting holes for attaching wireless microphone receivers, camera accessories, adapter boxes, and adapter plates. The third part is a combination of one or more adapter boxes and plates. The adapter box is open on the top and partially open on the bottom, with a system of mounting holes to attach it, and an additional adapter box or adapter plate, to the vertical section. The adapter box has a horizontal tab at the bottom and a spring and spring clip system inside the box to secure a wireless microphone receiver. The adapter plate is a vertical plate with a horizontal tab at the bottom. The adapter plate has system of mounting holes for attaching it to the vertical section of the bracket system or to an adapter box. A resilient pad is attached to the adapter plate and a hook and loop strap system holds a wireless microphone receiver firmly against the resilient pad, securing it in place.

3 Claims, 5 Drawing Sheets

WIRELESS RECEIVER MOUNTING SYSTEM FOR VIDEO CAMERAS

CROSS-REFERENCE TO RELATED APPLICATIONS

This patent application is claiming the benefit of previously filed provisional patent application #60/437,681 which is for the current invention and has a filing date of Jan. 3, 2003.

BACKGROUND OF THE INVENTION a. Field of Invention

This invention relates to video cameras; specifically to a bracket system for mounting wireless microphone receivers and other accessories to a video camera.

b. Prior Art

In the field of video production, a camera operator often operates a video camera while it is mounted to an adjustable camera tripod. This allows the operator to pan the camera from side to side and tilt the camera up and down in a smooth and steady fashion. A camera operator will sometimes carry the camera by hand or on their shoulder, allowing them to move about freely. It is common to attach accessories such as lights, microphones, and wireless microphone receivers to the video camera, allowing the camera operator to quickly switch back and forth between "tripod mounted" and "hand held" use. Recently, professional quality video cameras have become very small in size, leaving little or no room on the camera for mounting accessories. This presented a problem for the camera operators who now had to mount wireless microphone receivers on their waist or on the camera tripod. Mounting the receiver on their waist often caused poor reception as the antennae are often blocked from the transmitted signal. The operator would also be connected to the camera with a tangle of wires making it difficult step away from the camera while it is mounted on the tripod. In the case where the wireless microphone receiver is mounted on the tripod, the camera operator is unable to detach the camera from the tripod and move about freely during hand held operation.

Some related, yet vastly different inventions include the following:

The wireless microphone receiver holder in patent 389,154 attaches over the battery of a full size video camera and is limited to use with full size video cameras. It is not able to fit on the smaller camera batteries found on modern smaller video cameras.

The video camera bracket in U.S. Pat. No. 6,601,999 is suitable for mounting some accessories, but does not include any apparatus to directly mount wireless microphone receivers. When U.S. Pat. No. 6,601,999 refers to a "tripod", it is referring to the three legs of the camera bracket. The video camera bracket in U.S. Pat. No. 6,601,999 interferes with the use of a camera tripod, which is a standard accessory for a video camera, thus defeating the purpose of mounting accessories on the camera bracket. The inventer of this invention probably didn't think of a suitable system for mounting wireless microphone receivers during tripod use because the invention's main purpose is to provide additional handles for holding the video camera by hand.

The support for video camera in U.S. Pat. No. 5,612,756 has a bar which may be suitable for mounting some accessories, but due to it's limited mounting system and interference with tripod use, is unsuitable for mounting wireless microphone receivers. The inventer of this invention probably didn't think of a suitable system for mounting wireless microphone receivers during tripod use because the invention's main purpose is to provide a shoulder mount for holding a video camera by hand.

The harness in U.S. Pat. No. 338,999 is a carrying case designed for transportation of video equipment and is not related to mounting wireless microphone receivers on a video camera.

The hand held video camera support in U.S. Pat. No. 5,064,109 is designed for video camera use without a tripod and does not provide a means of attaching accessories such as wireless microphone receivers.

The video camera accessory apparatus in U.S. Pat. No. 5,189,520 is designed to attach a TV tuner unit to the camera and does not provide a means of attaching accessories such as wireless microphone receivers.

The accessory shoe adapter in U.S. Pat. No. 5,068,683 is designed to mount to a video camera's battery connector. It can attach to a limited variety of video cameras and can attach a limited number of accessories such as a light. This shoe adapter does not include a mounting system for wireless microphone receivers and may cause damage to the battery connection system of the camera if the weight of mounted accessories is excessive.

The video camera carrying handle in U.S. Pat. No. 5,121,147 is designed to provide a handle to carry the video camera while allowing a battery and light to be attached but does not provide a means of attaching accessories such as wireless microphone receivers.

Objects and Advantages

Accordingly, several objects and advantages of my invention include the following:

My invention mounts the wireless receivers to the video camera, allowing the camera operator to easily mount and leave the camera on a tripod or quickly remove the tripod and move about freely for hand held operation of the camera.

My invention mounts the wireless microphone receivers on the right side of the video camera, in front of the camera's tripod mounting holes in such a position as not to impede use of the video camera or wireless receivers.

My invention includes a versatile wireless microphone receiver mounting system, designed to accept most available wireless microphone receivers which were designed for use on a video camera.

My invention includes a recessed camera mounting screw as part of it's video camera mounting system, allowing for full functionality of it's tripod mounting system, also included on my invention.

My invention is light in weight as not to burden the camera operator during hand held use of the camera.

In addition to wireless microphone receivers, my invention can be used to attach a variety of other accessories.

Further objects and advantages of my invention will become apparent from a consideration of the drawings and ensuing description.

SUMMARY

The purpose of the present invention is to provide a suitable means for mounting wireless microphone receivers to a small video camera in such a way that allows full use and function of the video camera, camera controls, and wireless microphone receiver, while also allowing the camera operator to easily switch between hand held camera operation and tripod mounted operation.

BRIEF DESCRIPTION OF THE DRAWINGS

FIG. 3-B is a perspective view of a second embodiment of the invention shown in an exploded view.

LIST OF REFERENCE NUMERALS

10—video camera
12—wireless microphone receiver
14—mounting bracket
16—second embodiment of mounting bracket
18—adapter box
19—second embodiment of adapter box
20—adapter plate
21—second embodiment of adapter plate
22—alignment plate
23—screw
24—flat head screw
25—mounting holes
26—mounting slots
27—resilient non-skid pad
28—retainer clip
29—foot
30—tripod mounting hole
32—tripod alignment hole
34—threaded hole
36—hollow pockets
38—alignment pin
40—recessed screw pocket
42—camera mounting screw
44—spring clip
46—PEM threaded insert
48—access hole
50—rivet
52—spring
54—tab
56—auxiliary mounting holes
59—strap slot
62—resilient rubber pad
64—hook and loop strap

DETAILED DESCRIPTION

Figure 1:
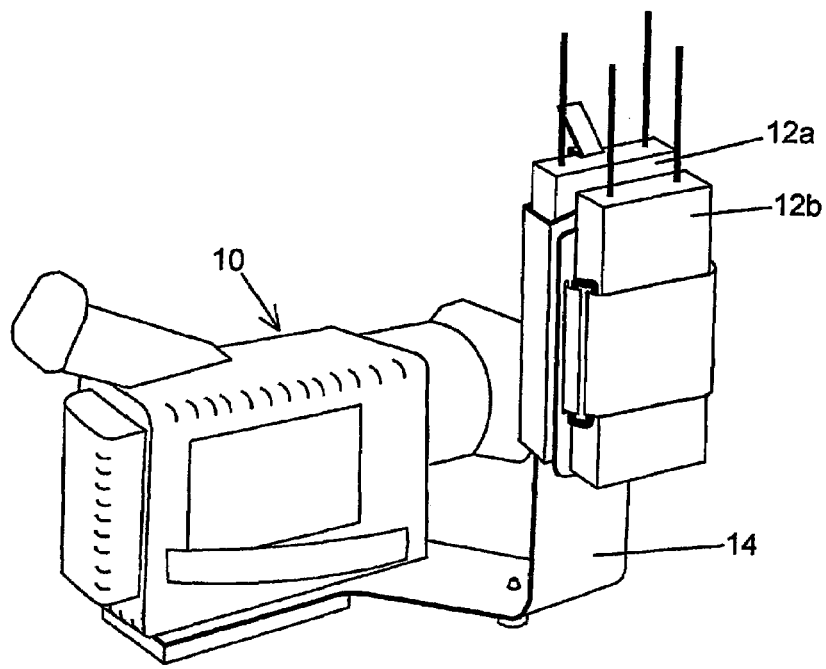
FIG. 1 is a perspective view of the invention shown in use with a video camera and two wireless microphone receivers.

The present invention relates to a bracket system for attaching wireless microphone receivers and other accessories to a video camera. FIG. 1 shows a perspective view of the invention attached to a video camera 10 and two wireless microphone receivers 12a and 12b. From the video camera operator's point of view, the invention mounts wireless microphone receivers 12a and 12b high on the right side of the video camera, towards the front. This position allows for full functionality of the video camera and wireless receivers, without obstructing any of the controls.

Figure 2:
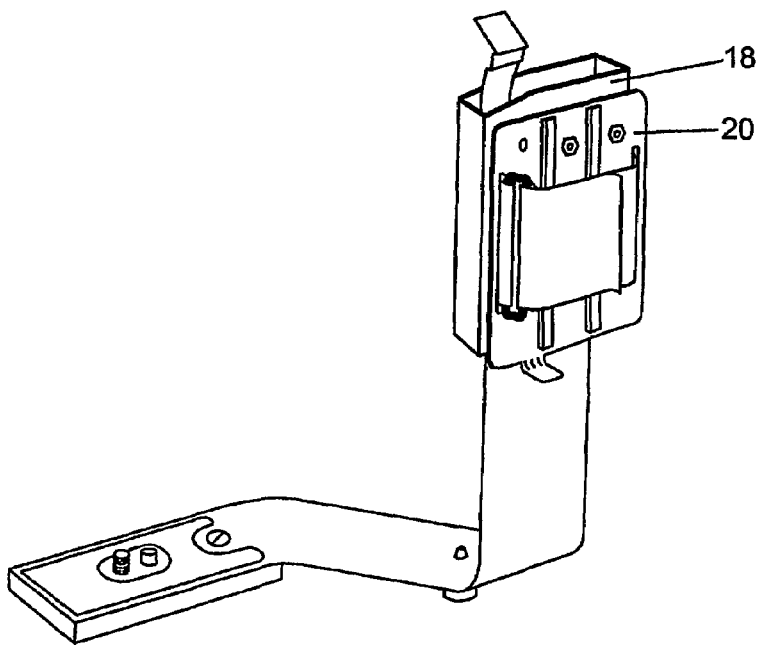
FIG. 2 is a perspective view of the invention

FIG. 2 shows a perspective view of the bracket system which is comprised of a platform section, where the video camera is mounted; a vertical section where the wireless microphone receivers and other accessories are mounted; and a plurality of adapter box 18 and adapter plate 20, which can be used to aid in mounting wireless microphone receivers and other accessories to the vertical wall section.

Figure 3A:
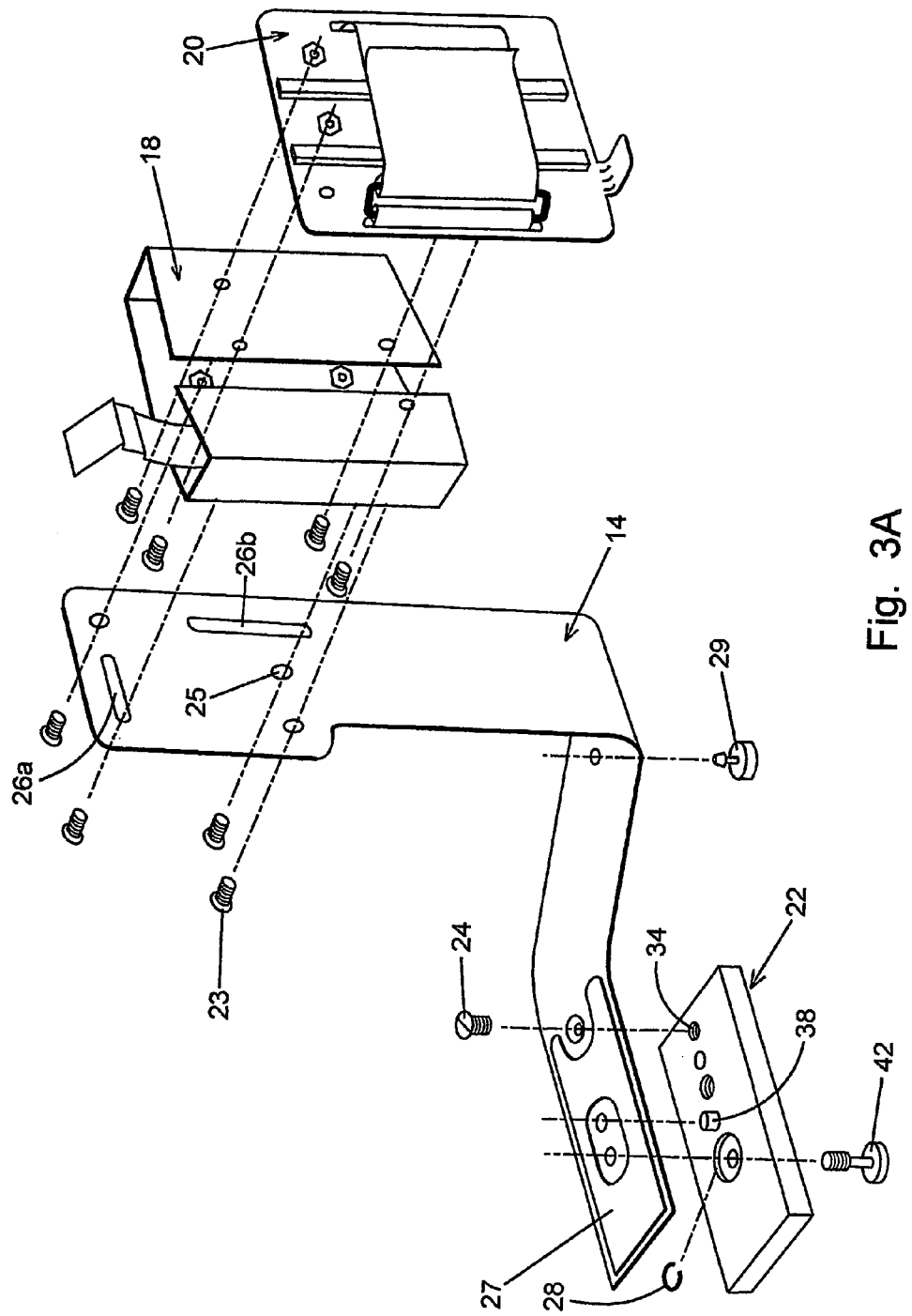
FIG. 3-A is a perspective view of the preferred embodiment of the invention shown in an exploded view.

FIG. 3A shows an exploded perspective view of the preferred embodiment of the invention. The horizontal platform section of the invention is comprised of alignment plate 22 which is attached to mounting bracket 14 with flat head screw 24 into threaded hole 34. In the preferred embodiment of the invention, mounting bracket 14 is stamped from a sheet, approximately 0.1 inches thick, of lightweight metal such as aluminum; alignment plate 22 is machined from a bar of lightweight metal such as aluminum. Camera mounting screw 42 passes through both alignment plate 22 and mounting bracket 14, and screws into the existing mounting holes on the bottom of a video camera. Retainer clip 28 is attached to camera mounting screw 42, holding it in place when the invention is not in use. Alignment pin 38 is pressed into alignment plate 22 and passes through mounting bracket 14 into an alignment hole in the bottom of a video camera, keeping the the invention from rotating while attached to the camera. Resilient non-skid pad 27 consists of a thin sheet of resilient material such as rubber, with an adhesive backing holding it in place on mounting bracket 14. Resilient non-skid pad 27 helps produce a snug fit between the camera and the invention, preventing vibration or twisting. Foot 29 is an injection molded rubber grommet which keeps the camera and bracket system level when set on a flat surface.

Figure 4:
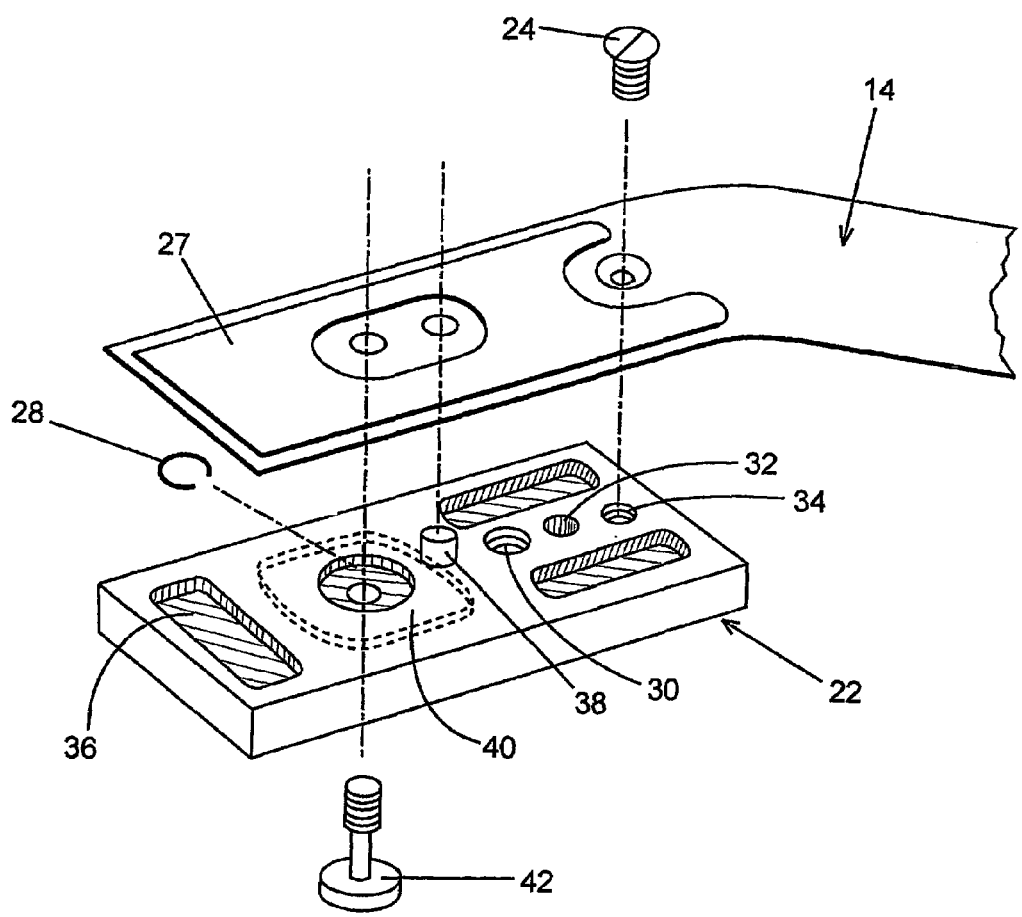
FIG. 4 is an exploded, partial view in detail of the preferred embodiment of the invention.

FIG. 4 shows a close up perspective view of alignment plate 22. Recessed screw pocket 40 is on the underside of alignment plate 22, and allows camera mounting screw 42 to be recessed within alignment plate 22, sitting flush with the bottom of alignment plate 22. Tripod mounting hole 30 and tripod alignment hole 32 pass completely through alignment plate 22. Tripod mounting hole 30 is threaded with a stainless steel insert for durability. Tripod mounting hole 30 and tripod alignment hole 32 are similar to the mounting holes found of the bottom of a video camera, allowing accessories such as a tripod, to be mounted to the invention while installed on the camera. In order to shift the weight of the camera back for better balance while mounted on a tripod, tripod mounting hole 30 and tripod alignment hole 32 are placed in front of camera mounting screw 42 and alignment pin 38. FIG. 4 also shows hollow pockets 36 which function to lighten the weight of alignment plate 22.

As shown in FIG. 3A, the invention's vertical section has a pattern of mounting holes 25 and mounting slots 26a and 26b, which conform to the bolt patterns of many wireless microphone receiver mounts. Adapter box 18 and adapter plate 20 connect to mounting bracket 14 with a set of screws 23, through the mounting holes 25 and mounting slot 26a. Adapter box 18 or adapter plate 20 can be attached directly to mounting bracket 14, either individually, or in any combination of two. Adapter box 18 and adapter plate 20 are used to mount wireless microphone receivers which were not equipped with suitable mounting hardware to connect directly to mounting bracket 14.

Figure 5:
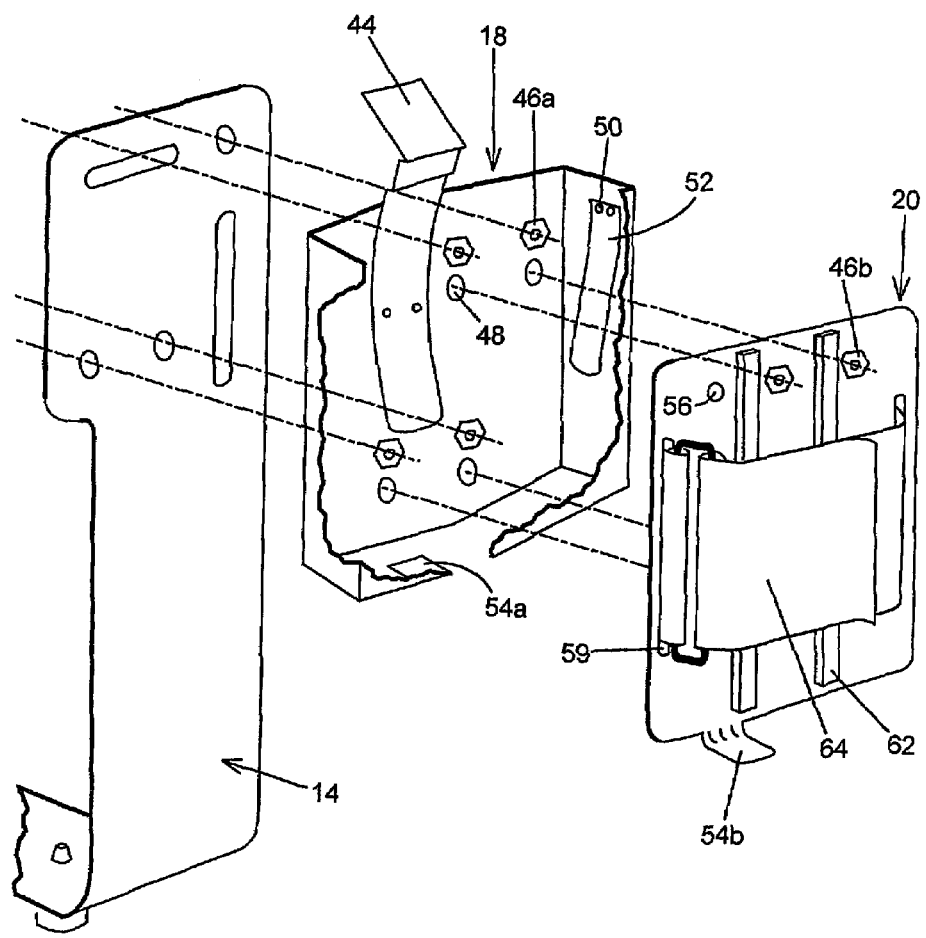
FIG. 5 is an exploded partial sectional view in detail of the preferred embodiment of the invention.

FIG. 5 shows a close up, perspective, sectional view of adapter box 18 and adapter plate 20. The preferred embodiment of adapter box 18 includes a box, open at the top and bottom, stamped and bent from lightweight sheet of metal such as aluminum. Tab 54a prevents a wireless microphone receiver from slipping through the box. Rivets 50 attach spring clip 44 and spring 52 to the inside of adapter box 18. Spring clip 44 and spring 52 compress to hold a variety of different size wireless microphone receivers firmly against the opposite walls of adapter box 18. These opposite walls are covered with an adhesive backed fabric or felt, to protect the wireless microphone receiver from being scratched. Ridges at the top of spring clip 44 prevent the wireless microphone receiver from coming out the top of the box unless the spring tension is released by pushing back the top of spring clip 44. Adapter box 18 has a system of mounting holes on 2 opposite sides. In the preferred embodiment, four PEM threaded inserts 46a are stainless steel threaded inserts. Access holes 48 provide access to the interior of adapter box 18 in order to attach another adapter box 18 or an adapter plate 20.

The preferred embodiment of adapter plate 20 includes a flat, vertical section formed from a sheet of metal such as aluminum, with tab 54b at the bottom. Two resilient rubber pads 62 are attached to adapter plate 20 and provide a surface which conforms to the shape of the wireless microphone receiver, helping to keep it in place. Hook and loop strap 64 is threaded through strap slots 59 and holds the wireless microphone receiver securely against the resilient rubber pads 62. Four PEM threaded inserts 46b are used to mount adapter plate 20 to the bracket system. Two auxiliary mounting holes 56 allow two mounting plates 20 to be attached back to back on either side of mounting bracket 14.

Figure 3B:
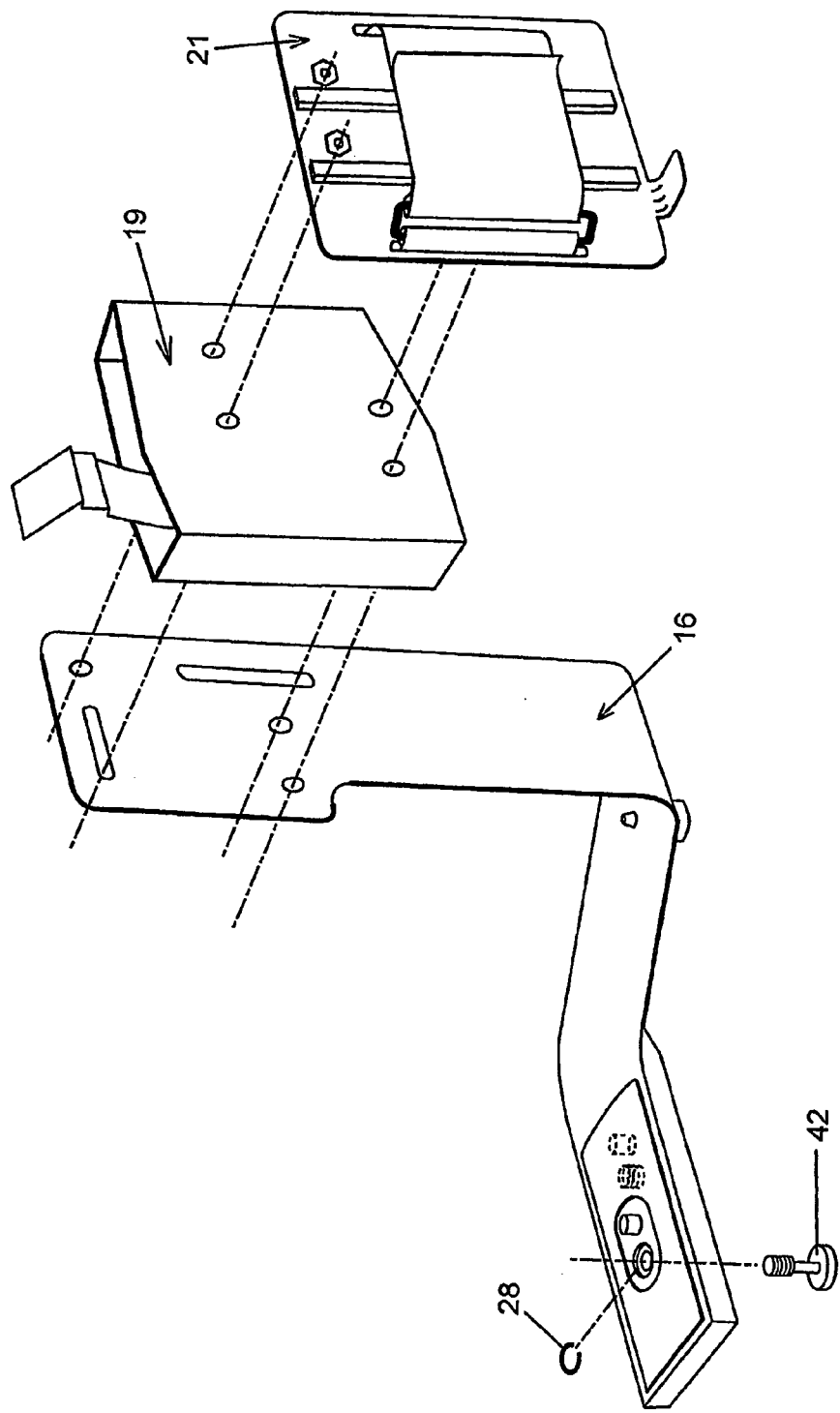

FIG. 3B shows an exploded perspective view of another embodiment of the invention. A second embodiment of mounting bracket 16, adapter box 19, or adapter plate 21 could be formed by die casting or injection mold using a lightweight material such as aluminum, plastic, or a composite material. In addition, a second embodiment of adapter box 19 could be fabricated from an extruded piece of aluminum.

Thus the reader will see that my invention provides a lightweight, sturdy, universal mounting system for wireless microphone receivers and accessories which can be easily used by any video camera operator.

While the above description contains many specificities, these should not be construed as limitations on the scope of the invention, but rather as an exemplification of one preferred embodiment thereof. Many other variations and uses are possible. For example, my invention can be used to hold a number of different accessories such as microphones and lights, with or without additional adapter bracket. My invention could be used as a handle for holding the camera.

Accordingly, the scope of the invention should be determined not by the embodiments illustrated, but by the appended claims and their legal equivalents.

What is claimed is:

1. A bracket system for mounting wireless microphone receivers and other accessories to a video camera or camcorder wherein said bracket system comprises:
   a vertical portion attached to a platform portion;
   said platform portion containing means for attaching said video camera;
   said platform portion also containing a means of attaching a camera tripod while said video camera is attached;
   said vertical portion containing means for attaching said wireless microphone receivers and accessories;
   said vertical portion containing a set of mounting holes as a means for attaching adapters to aid in the mounting of additional accessories;
   said vertical portion also containing a removable adapter, used for attaching said wireless microphone receivers and accessories;
   said removable adapter comprises:
      a wall section providing enough area to mount said wireless microphone receiver and accessories;
      said wall system has a series of slots, through which a hook and loop strap system is threaded and looped back upon itself;
      said wall section is at least partially covered with a thick, form fitting, resilient pad, located such that said hook and loop strap system holds said wireless microphone receiver against said resilient pad, securing said wireless microphone receiver in place;
      said hook and loop strap system can be pulled tight through a leveraged pulley system, tightening around said wireless microphone receiver and accessories, forcing them into said resilient pad, creating an indentation and securing said wireless microphone receiver and accessories in place;
      said wall section includes a tab at it's base to additionally secure accessories;
   whereby a person can easily operate said video camera and said wireless microphone receivers, with or without a camera tripod attached.

2. The bracket system of claim 1, wherein said means for attaching said video camera includes a mounting screw protruding upward through said platform portion, able to attach to existing tripod mounting holes on the underside of said video camera;
   said mounting screw is held in place with a curved retaining ring, preventing it from separation from said platform when said bracket system is removed from said video camera.

3. A removable adapter box for mounting wireless microphone receivers and other accessories to a video camera, camcorder, or bracket system wherein said adapter comprises:
   a means for attaching said adapter box to said bracket system;
   a means for attaching additional adapter brackets or a second adapter box to said adapter box;
   a back section, two side sections, a front section, open on the top, and partially open on the bottom;
   a means for securing said wireless microphone receiver within said back section, said side sections, and said front section;
   said means for securing said wireless microphone receiver comprises a spring system, attached such that pressure is applied to said wireless microphone receiver, forcing said wireless microphone receiver against said back section, said side section, or said front section;
   said spring system includes at least one spring clip either mounted to the box or mounted as part of the box;
   the top of said spring clip may be angled or ridged in shape such that once said wireless microphone receiver is mounted, said angled or ridged shape would secure said wireless microphone receiver in place.

* * * * *